M. CHRISTMAN.
WHEEL HUB PLATE.
APPLICATION FILED MAR. 1, 1916.
1,241,343.
Patented Sept. 25, 1917.
2 SHEETS—SHEET 1.
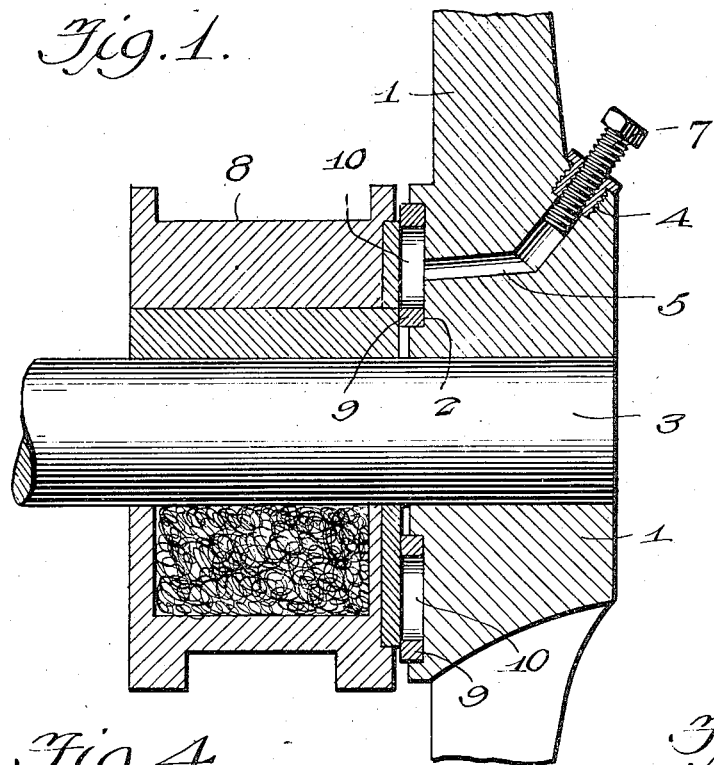
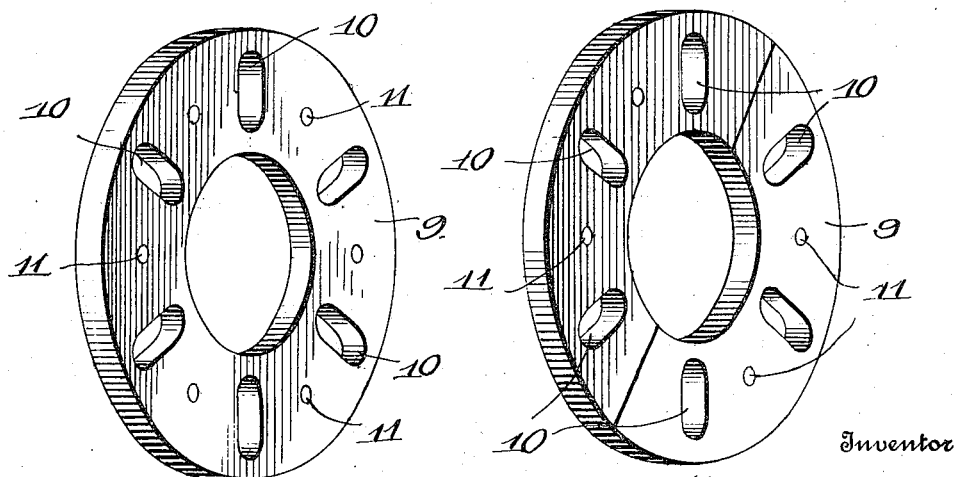
Witnesses
Hugh H. Ott
J W Garner
Inventor
Matthias Christman
By Victor J. Evans
Attorney

M. CHRISTMAN.
WHEEL HUB PLATE.
APPLICATION FILED MAR. 1, 1916.

1,241,343.

Patented Sept. 25, 1917.
2 SHEETS—SHEET 2.

Witnesses
Hugh H. Ott
J. W. Garner

Inventor
Matthias Christman
By Victor J. Evans
Attorney

UNITED STATES PATENT OFFICE.

MATTHIAS CHRISTMAN, OF SPRINGFIELD, MISSOURI.

WHEEL-HUB PLATE.

1,241,343.     Specification of Letters Patent.     Patented Sept. 25, 1917.

Application filed March 1, 1916. Serial No. 81,499.

*To all whom it may concern:*

Be it known that I, MATTHIAS CHRISTMAN, a citizen of the United States, residing at Springfield, in the county of Greene and State of Missouri, have invented new and useful Improvements in Wheel-Hub Plates, of which the following is a specification.

This invention is an improved wheel hub plate, the object of the invention being to provide an improved hub plate which will permit lubricant to pass directly therethrough so that friction will be reduced to the minimum.

This invention is an improvement on the wheel hub plate described and claimed in the Letters Patent of the United States No. 1,028,677 granted to me June 4th, 1912.

The invention consists in the construction, combination and arrangement of devices hereinafter described and claimed.

In the accompanying drawings:—

Figure 1 is a vertical sectional view of the central portion of a locomotive driving wheel provided with a hub plate constructed and arranged in accordance with my invention.

Fig. 4 is a detail perspective view of the hub plate.

Fig. 5 is a similar view of a modified form of the hub plate in which the latter is formed in separable sections.

Figure 2:
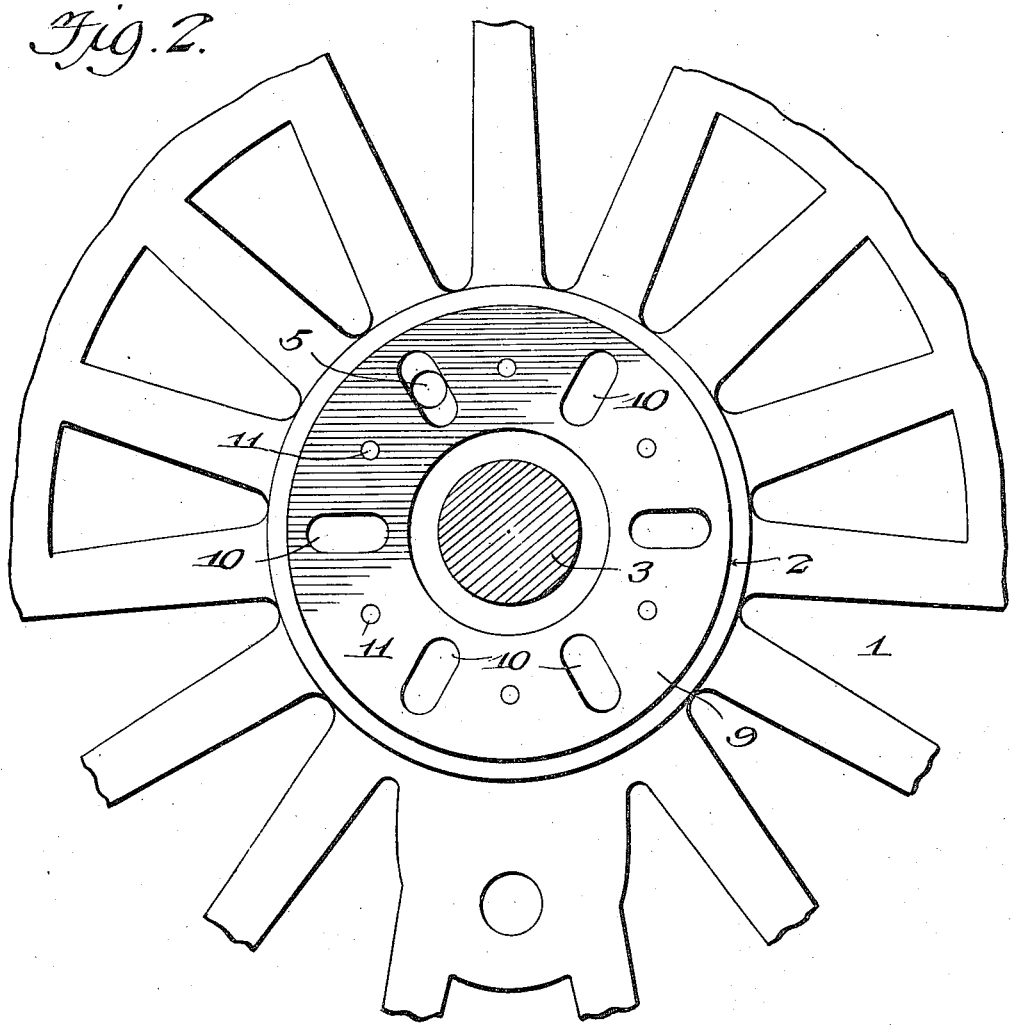
Fig. 2 is an elevation, showing the inner side of the wheel and hub plate, and showing the wheel and axle in cross section.
Figure 3:
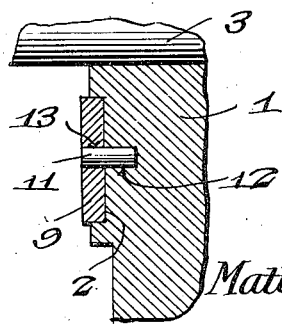
Fig. 3 is a sectional view on a plane disclosing two of the dowel pins.

In accordance with my invention the wheel 1 is provided on its inner side with an annular recess 2 which is concentric with and spaced from the axle 3. The wheel is provided with a threaded socket 4 for the reception of lubricant and with a passage 5 which leads from said socket to the recess 2. A bushing is screwed in the socket and is provided with a threaded bore in which a force plug 7 is screwed.

The bearing or driving box of the axle is indicated at 8. The hub plate 9 is annular, fits in the recess 2 of the wheel, is arranged directly between the inner side of the wheel and the outer face of the bearing or driving box and is provided with a series of lubricant receiving pockets 10 which are openings that extend entirely through and across the hub plate from its inner to its outer side. One of these pockets registers with the passage 5. The hub plate is secured to the wheel for rotation therewith by dowel pins 11 which are fitted in openings 12, 13 with which the wheel and hub plate are respectively provided.

In the operation of my invention grease or lubricant is forced by the plug 7 through the passage 5 and through one of the pockets in the hub plate. Grease or lubricant that works out of the driving box cellars finds its way between the driving box and the hub plate and keeps the pockets of the hub plate full. Hence the opposing faces of the driving or bearing box and the hub plate are kept lubricated and friction is reduced to the minimum. Additional lubricant can be supplied at any time to the wheel by first removing the plug 7, as will be understood.

When the hub plate is to be attached to a new wheel the hub plate is made of a single piece of material and is applied to the wheel before the latter is pressed on the axle. If the hub plate is to be applied to a wheel that has already been pressed on the axle the hub plate is made of two segments as shown in Fig. 5 to enable the hub plate to clear the axle, and be applied to the wheel, as will be understood.

Having thus described my invention what I claim is:—

In combination with a wheel and axle and with a bearing box for the axle, said wheel having an annular recess concentric with and spaced from the axle and in the side of the wheel opposed to the bearing box, an annular hub plate fitted in said recess and of a thickness exceeding the depth of said recess so that a space is formed around the axle and between the opposing sides of the wheel and bearing box, said hub plate having a series of elongated radially arranged pockets extending transversely entirely therethrough and open at each side of said hub plate, and dowel pins securing said hub plate to the axle and arranged at points intermediate the pockets, the wheel being provided with means to supply lubricant to one of said pockets, the other pockets being not in communication with the lubricant supply means on the side toward the wheel.

In testimony whereof I affix my signature in presence of two witnesses.

MATTHIAS CHRISTMAN.

Witnesses:
GEORGE A. McLAUGHLIN.
HARRY L. BISSETT.